United States Patent
Li

(10) Patent No.: US 9,832,255 B2
(45) Date of Patent: Nov. 28, 2017

(54) EVENT DISTRIBUTION METHOD, CONTROL DEVICE, AND PROCESSOR ON SOFTWARE-DEFINED NETWORK

(71) Applicant: Huawei Technologies Co., Ltd., Shenzhen (CN)

(72) Inventor: Yi Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 372 days.

(21) Appl. No.: 14/673,444

(22) Filed: Mar. 30, 2015

(65) Prior Publication Data

US 2015/0207871 A1  Jul. 23, 2015

Related U.S. Application Data

(63) Continuation of application No. PCT/CN2013/090907, filed on Dec. 30, 2013.

(51) Int. Cl.
*H04L 29/06* (2006.01)
*H04L 29/08* (2006.01)
*H04L 12/24* (2006.01)

(52) U.S. Cl.
CPC ........ *H04L 67/101* (2013.01); *H04L 41/0604* (2013.01)

(58) Field of Classification Search
CPC .......................... H04L 67/101; H04L 41/0604
See application file for complete search history.

(56) References Cited

U.S. PATENT DOCUMENTS

| 9,203,701 B2 * | 12/2015 | Koponen | ............ H04L 41/0893 |
| 9,450,817 B1 * | 9/2016 | Bahadur | ............ H04L 41/0806 |
| 2013/0250770 A1 | 9/2013 | Zou et al. | |

(Continued)

FOREIGN PATENT DOCUMENTS

| CN | 102279744 A | 12/2011 |
| CN | 103023765 A | 4/2013 |

(Continued)

OTHER PUBLICATIONS

"Improving Network Management with Software Defined Networking"—Kim et al, Georgia Institute of Technology, May 2013 http://gtnoise.net/papers/2013/kim-ieee2013.pdf.*

(Continued)

*Primary Examiner* — Randy Scott
(74) *Attorney, Agent, or Firm* — Conley Rose, P.C.

(57) ABSTRACT

An event distribution method, a control device, and a processor on a software-defined network (SDN), where an event distribution module processes, in a preset order using a first workflow that includes at least two event processing nodes, an event that is generated by a device object generating module, and sends a processed event to a first application program processing module using a first application event processing node. The first workflow is created according to an instruction of the first application program processing module, so that the event that is sent to the first application program processing module can be processed according to the instruction of the first application program processing module. Therefore, the event that is sent to the application program processing module does not need to meet a predetermined requirement.

37 Claims, 12 Drawing Sheets

(56) References Cited

U.S. PATENT DOCUMENTS

| | | | |
|---|---|---|---|
| 2013/0266007 A1 | 10/2013 | Kumbhare et al. | |
| 2014/0223013 A1* | 8/2014 | Gaglianello | H04L 61/2084 709/226 |
| 2014/0280893 A1* | 9/2014 | Pfeifer | H04L 43/04 709/224 |
| 2015/0244617 A1* | 8/2015 | Nakil | G06F 9/45558 709/224 |

FOREIGN PATENT DOCUMENTS

| | | |
|---|---|---|
| CN | 103095565 A | 5/2013 |
| CN | 103428771 A | 12/2013 |

OTHER PUBLICATIONS

McCauley, M., "POX Wiki—Open Networking Lab—Confluence," Nov. 12, 2013, XP055205472, Retrieved from the Internet: https://openflow.stanford.edu/pages/viewpage.action?pageId=11829329#POXWiki-EventsWithMultipleListeners, retrieved on Jul. 30, 2015, 60 pages.

Cai, Z., "Using and Programming in Maestro," Oct. 30, 2012, XP055205621, Retrieved from the Internet: https://web.archive.org/web/20121030052157/http://maestro-platform.googlecode.com/files/programming.pdf, retrieved on Jul. 30, 2015, 14 pages.

Murphy Mc, "pox/revent.py at 4aa6e94051c56333e61ae3d2955aff83dfbef1ef.noxrepo/pox. GitHub," Jun. 8, 2013, XP055205683, Retrieved from the Internet: https://github.com/noxrepo/pox/blob/4aa6e94051c56333e61ae3d2955aff83dfbef1ef/pox/lib/revent/revent.py, retrieved on Jul. 31, 2015, 8 pages.

Foreign Communication From a Counterpart Application, European Application No. 13893202.5, Extended European Search Report, dated Aug. 7, 2015, 8 pages.

Foreign Communication From a Counterpart Application, PCT Application No. PCT/CN2013/090907, International Search Report dated Sep. 19, 2014, 7 pages.

Foreign Communication From a Counterpart Application, PCT Application No. PCT/CN2013/090907, Written Opinion dated Sep. 19, 2014, 3 pages.

Machine Translation and Abstract of Chinese Publication No. CN102279744, dated Dec. 14, 2011, 11 pages.

Machine Translation and Abstract of Chinese Publication No. CN103023765, dated Apr. 3, 2013, 7 pages.

Foreign Communication From a Counterpart Application, Chinese Application No. 201380002714.X, Chinese Office Action dated Apr. 12, 2017, 5 pages.

Foreign Communication From a Counterpart Application, Chinese Application No. 201380002714.X, Chinese Search Report dated Mar. 30, 2017, 2 pages.

* cited by examiner

EVENT DISTRIBUTION METHOD, CONTROL DEVICE, AND PROCESSOR ON SOFTWARE-DEFINED NETWORK

CROSS-REFERENCE TO RELATED APPLICATIONS

This application is a continuation of International Application No. PCT/CN2013/090907, filed on Dec. 30, 2013, which is hereby incorporated by reference in its entirety.

TECHNICAL FIELD

The present invention relates to the field of information technologies, and in particular, to an event distribution method, a control device, and a processor on a software-defined network (SDN).

BACKGROUND

An SDN is of a new type of innovative network architecture, whose core technology OpenFlow separates a control plane of a network device from a data plane, thereby implementing flexible control of network traffic, and providing a favorable platform for innovation of a core network and applications.

On the SDN network, each network device retains only a forwarding function, and all control functions are integrated to one controller. The SDN network includes a host, a forwarding device, and a controller. The host is a network endpoint, and an initiator or a terminator of communication; the forwarding device is responsible for sending a data packet, and shares one centralized control plane (that is, the controller on the SDN) with other devices instead of having any independent control plane; the controller is a control center on the SDN and responsible for controlling and managing the forwarding device. When hosts communicate with each other, a communication channel is not obtained by means of negotiation between forwarding devices, but is calculated by the controller and is delivered to each forwarding device.

The controller on the SDN implements control and management using software modules, such as software logic, a northbound interface, a Network Operating System (NOS), and a southbound interface. Herein, control logic is a network application program or service, which interacts with the NOS using the North-Bound Interface (NBI), so that the NOS controls the forwarding device using the South-Bound Interface (SBI), to implement a function, such as data forwarding, that is to be implemented as required by the control logic.

An event generated by the forwarding device needs to be sent to an application program on the NOS for processing. In the prior art, event distribution is implemented based on a subscription/publication mechanism. If the application program needs to process an event, the event must be explicitly registered with the application program. When a new event is generated because a new device is added, code needs to be modified to adapt to the new event, so that the event distribution mechanism is not flexible enough.

SUMMARY

Embodiments of the present invention provide an event distribution method, a control device, and a processor on a SDN, so as to solve a problem in the prior art that an event distribution mechanism is not flexible.

An embodiment of the present invention provides a control device on a SDN, where the control device includes a service processing module, an event distribution module, and a device object generating module, where the service processing module includes a first application program processing module; the event distribution module is configured to receive an event generated by the device object generating module, process the event in a preset order using a first workflow that includes at least two event processing nodes, and send a processed event to the first application program processing module using a first application event processing node, where the first workflow is created according to an instruction of the first application program processing module; the first application program processing module is configured to receive the event sent by the event distribution module, and process the received event according to a preset rule; and the device object generating module is configured to receive status change information sent by a network device, generate the event according to the change information, and send the generated event to the event distribution module.

Optionally, the service processing module further includes a second application program processing module; and after processing the received event according to the preset rule, the first application program processing module sends a processed event to the event distribution module, and the event distribution module sends the processed event to the second application program processing module using a second application event processing node in the first workflow, so that the second application program processing module processes the processed event according to a preset rule, where the second application event processing node is created in the first workflow by the event distribution module according to an instruction of the second application program processing module.

Optionally, the service processing module further includes a second application program processing module; and after processing the received event according to the preset rule, the first application program processing module sends a processed event to the event distribution module, and the event distribution module sends the processed event to the second application program processing module using a second application event processing node in a second workflow, so that the second application program processing module processes the event according to a preset rule, where the second workflow is created by the event distribution module according to an instruction of the second application program processing module.

Optionally, the event distribution module further includes a workflow management module, where the workflow management module is configured to create the first workflow according to the instruction of the first application program processing module; or create the second workflow according to the instruction of the second application program processing module.

Optionally, the event processing nodes in the first workflow include a root node and an application node, where the root node is configured to receive the event sent by the device object generating module, and send the event to another processing node in the workflow; and the application node is configured to send the event that is processed using the workflow to the first application program processing module.

Optionally, the event processing nodes in the first workflow further include a filter node, where the filter node is configured to set an event filtering rule, and match, according to the filtering rule, an event passing through the filter node; and if the event meets the filtering rule, send the event to a subnode of the filter node in the first workflow; or if the event does not meet the filtering rule, stop processing the event.

Optionally, the filtering rule includes a matching field, a value field, and an expression, where the matching field is used to set an object to which the filtering rule applies; the value field is used to set a range of an attribute value corresponding to the matching field; and the expression is used to set a logical relationship between the matching field and the value field.

Optionally, the event processing nodes in the first workflow further include a preprocessor node, where the preprocessor node is configured to preprocess an event, and add an event attribute by parsing information in the event.

Optionally, at least two event processing nodes in the first workflow form a tree structure in which the nodes are in sequence.

Optionally, the event processing node includes an event receiving module, a processing logic module, and a sending module, where the event receiving module is configured to receive an event from the device object generating module or another service processing node; the processing logic module is configured to process, according to a preset rule, the event received by the event receiving module; and the sending module is configured to send the event processed by the processing logic module to another node.

Optionally, the event includes an event header and an event body; the event header stores common information of the event in a form of a key-value pair, where the common information is specific information that is included in all events; and the event body stores attribute information of the event in a form of a key-value pair.

Optionally, the common information includes a source device identifier (ID) of the event and/or a type of the event.

Optionally, the event further includes metadata, where the metadata includes at least one record, where the record is used to store a log of processing on the event by the first application program processing module, or data of an update on a status of a switching device by the first application program processing module.

An embodiment of the present invention further provides an event distribution method on a SDN, where the method is applied to a control device that includes a first application program processing module, an event distribution module, and a device object generating module, including receiving, by the device object generating module, status change information sent by a network device, generating an event according to the change information, and sending the generated event to the event distribution module; processing, by the event distribution module, the event in a preset order using a first workflow that includes at least two event processing nodes, and sending a processed event to the first application program processing module using a first application event processing node, where the first workflow is created according to an instruction of the first application program processing module; and receiving, by the first application program processing module, the event sent by the event distribution module, and processing the received event according to a preset rule.

Optionally, the control device further includes a second application program processing module, where after processing the received event according to the preset rule, the first application program processing module sends a processed event to the service distribution module; the event distribution module sends the processed event to the second application program processing module using a second application event processing node in the first workflow; and the second application program processing module processes the processed event according to a preset rule, where the second application event processing node is created in the first workflow by the event distribution module according to an instruction of the second application program processing module.

Optionally, the service processing module further includes a second application program processing module; after processing the received event according to the preset rule, the first application program processing module sends a processed event to the service distribution module; the event distribution module sends the processed event to the second application program processing module using a second application event processing node in a second workflow; and the second application program processing module processes the event according to a preset rule, where the second workflow is created by the event distribution module according to an instruction of the second application program processing module.

Optionally, the event processing nodes in the first workflow include a root node and an application node, where the root node is configured to receive the event sent by the device object generating module, and send the event to another processing node in the workflow; and the application node is configured to send the event that is processed using the workflow to the first application program processing module.

Optionally, the event processing nodes in the first workflow further include a filter node, where the filter node is configured to set an event filtering rule, and match, according to the filtering rule, an event passing through the filter node; and if the event meets the filtering rule, send the event to a subnode of the filter node in the first workflow; or if the event does not meet the filtering rule, stop processing the event.

Optionally, the filtering rule includes a matching field, a value field, and an expression, where the matching field is used to set an object to which the filtering rule applies; the value field is used to set a range of an attribute value corresponding to the matching field; and the expression is used to set a logical relationship between the matching field and the value field.

Optionally, the event processing nodes in the first workflow further include a preprocessor node, where the preprocessor node is configured to preprocess an event, and add an event attribute by parsing information in the event.

Optionally, at least two event processing nodes in the first workflow form a tree structure in which the nodes are in sequence.

Optionally, the event processing node includes an event receiving module, a processing logic module, and a sending module, where the event receiving module is configured to receive an event from the device object generating module or another service processing node; the processing logic module is configured to process, according to a preset rule, the event received by the event receiving module; and the sending module is configured to send the event processed by the processing logic module to another node.

Optionally, the event includes an event header and an event body; the event header stores common information of the event in a form of a key-value pair, where the common information is specific information that is included in all events; and the event body stores attribute information of the event in a form of a key-value pair.

Optionally, the common information includes a source device ID of the event and/or a type of the event.

Optionally, the event further includes metadata, where the metadata includes at least one record, where the record is used to store a log of processing on the event by the first application program processing module, or data of an update on a status of a switching device by the first application program processing module.

An embodiment of the present invention further provides a processor on a SDN, where the processor is located in a control device on the SDN, and the processor includes a service processing module, an event distribution module, and a device object generating module, where the service processing module includes a first application program processing module; the event distribution module is configured to receive an event generated by the device object generating module, process the event in a preset order using a first workflow that includes at least two event processing nodes, and send a processed event to the first application program processing module using a first application event processing node, where the first workflow is created according to an instruction of the first application program processing module; the first application program processing module is configured to receive the event sent by the event distribution module, and process the received event according to a preset rule; and the device object generating module is configured to receive status change information sent by a network device, generate the event according to the change information, and send the generated event to the event distribution module.

Optionally, the service processing module further includes a second application program processing module; and after processing the received event according to the preset rule, the first application program processing module sends a processed event to the service distribution module, and the event distribution module sends the processed event to the second application program processing module using a second application event processing node in the first workflow, so that the second application program processing module processes the processed event according to a preset rule, where the second application event processing node is created in the first workflow by the event distribution module according to an instruction of the second application program processing module.

Optionally, the service processing module further includes a second application program processing module; and after processing the received event according to the preset rule, the first application program processing module sends a processed event to the service distribution module, and the event distribution module sends the processed event to the second application program processing module using a second application event processing node in a second workflow, so that the second application program processing module processes the event according to a preset rule, where the second workflow is created by the event distribution module according to an instruction of the second application program processing module.

Optionally, the event distribution module further includes a workflow management module, where the workflow management module is configured to create the first workflow according to the instruction of the first application program processing module; or create the second workflow according to the instruction of the second application program processing module.

Optionally, the event processing nodes in the first workflow include a root node and an application node, where the root node is configured to receive the event sent by the device object generating module, and send the event to another processing node in the workflow; and the application node is configured to send the event that is processed using the workflow to the first application program processing module.

Optionally, the event processing nodes in the first workflow further include a filter node, where the filter node is configured to set an event filtering rule, and match, according to the filtering rule, an event passing through the filter node; and if the event meets the filtering rule, send the event to a subnode of the filter node in the first workflow; or if the event does not meet the filtering rule, stop processing the event.

Optionally, the filtering rule includes a matching field, a value field, and an expression, where the matching field is used to set an object to which the filtering rule applies; the value field is used to set a range of an attribute value corresponding to the matching field; and the expression is used to set a logical relationship between the matching field and the value field.

Optionally, the event processing nodes in the first workflow further include a preprocessor node, where the preprocessor node is configured to preprocess an event, and add an event attribute by parsing information in the event.

Optionally, at least two event processing nodes in the first workflow form a tree structure in which the nodes are in sequence.

Optionally, the event processing node includes an event receiving module, a processing logic module, and a sending module, where the event receiving module is configured to receive an event from the device object generating module or another service processing node; the processing logic module is configured to process, according to a preset rule, the event received by the event receiving module; and the sending module is configured to send the event processed by the processing logic module to another node.

Optionally, the event includes an event header and an event body; the event header stores common information of the event in a form of a key-value pair, where the common information is specific information that is included in all events; and the event body stores attribute information of the event in a form of a key-value pair.

Optionally, the common information includes a source device ID of the event and/or a type of the event.

Optionally, the event further includes metadata, where the metadata includes at least one record, where the record is used to store a log of processing on the event by the first application program processing module, or data of an update on a status of a switching device by the first application program processing module.

The embodiments of the present invention provide an event distribution method, a control device, and a processor on a SDN, where an event distribution module processes, in a preset order using a first workflow that includes at least two event processing nodes, an event that is generated by a device object generating module, and sends a processed event to a first application program processing module using a first application event processing node. The first workflow is created according to an instruction of the first application program processing module, so that the event that is sent to the first application program processing module can be processed according to the instruction of the first application program processing module. Therefore, the event that is sent to the first application program processing module does not need to meet a predetermined format or requirement; when a new event is generated because a new device is added, the first application program processing module can process any event that passes through the first workflow. In this way, code does not need to be modified to adapt to the newly added event, thereby improving flexibility of event distribution.

BRIEF DESCRIPTION OF DRAWINGS

To describe the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Figure 1:
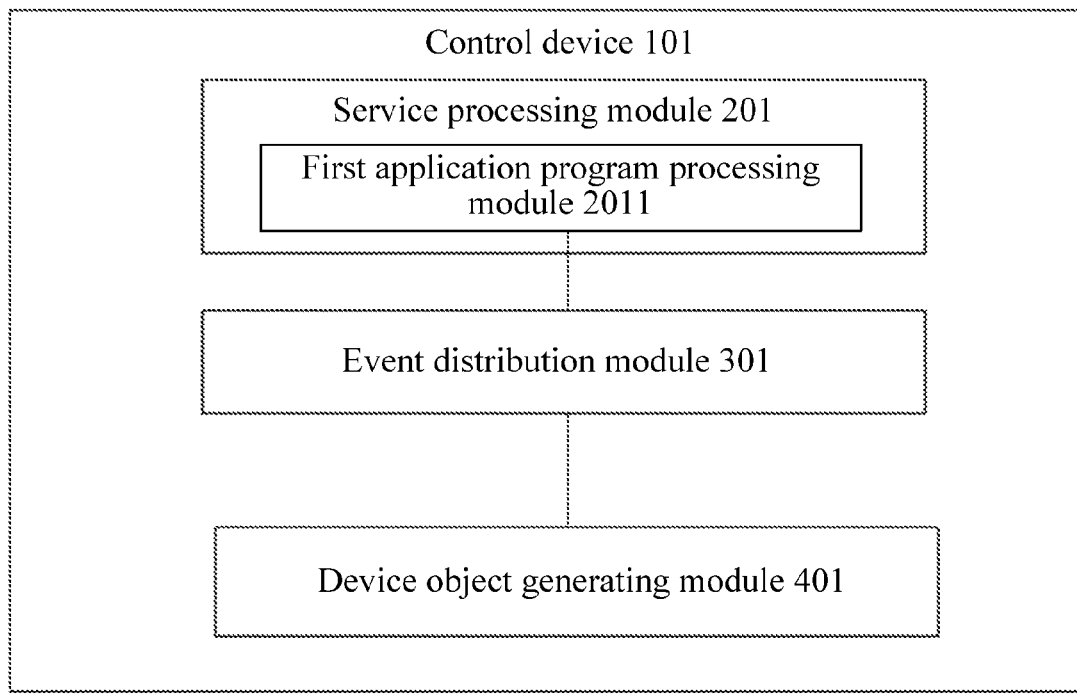
FIG. 1 is a schematic structural diagram of a control device 101 on a SDN according to an embodiment of the present invention.

FIG. 1 is a schematic structural diagram of a control device 101 in an implementation manner on a SDN according to an embodiment of the present invention.

The control device 101 on an SDN is shown in FIG. 1, where the control device 101 includes a service processing module 201, an event distribution module 301, and a device object generating module 401, where the service processing module 201 includes a first application program processing module 2011; the event distribution module 301 is configured to receive an event generated by the device object generating module 401, process the event in a preset order using a first workflow that includes at least two event processing nodes, and send a processed event to the first application program processing module 2011 using a first application event processing node, where the first workflow is created according to an instruction of the first application program processing module 2011; the first application program processing module 2011 is configured to receive the event sent by the event distribution module 301, and process the received event according to a preset rule; and the device object generating module 401 is configured to receive status change information sent by a network device, generate the event according to the change information, and send the generated event to the event distribution module 301.

According to the foregoing description, the event distribution module 301 processes, in the preset order using the first workflow that includes at least two event processing nodes, the event that is generated by the device object generating module 401, and sends the processed event to the first application program processing module 2011 using the first application event processing node. The first workflow is created according to the instruction of the first application program processing module 2011, so that the event that is sent to the first application program processing module 2011 can be processed according to the instruction of the first application program processing module 2011. Therefore, the event that is sent to the first application program processing module 2011 does not need to meet a predetermined format or requirement; when a new event is generated because a new device is added, the first application program processing module 2011 can process any event that passes through the first workflow. In this way, code does not need to be modified to adapt to the newly added event, thereby improving flexibility of event distribution.

Figure 2:
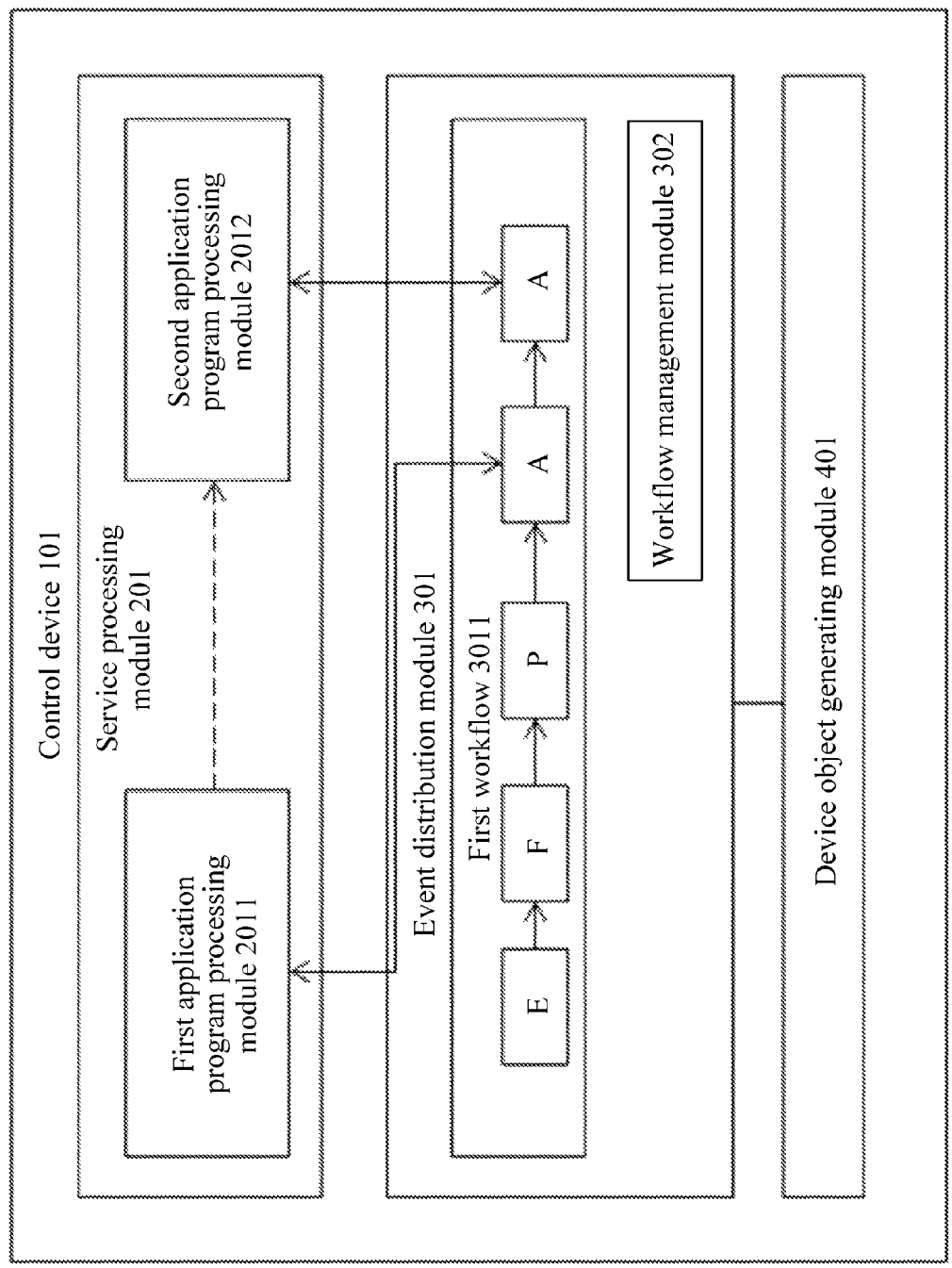
FIG. 2 is a schematic structural diagram of the control device 101 in another implementation manner on a SDN according to an embodiment of the present invention.

FIG. 2 is a schematic structural diagram of the control device 101 in another implementation manner on a SDN according to an embodiment of the present invention.

Referring to FIG. 2, as an optional implementation manner, the service processing module 201 further includes a second application program processing module 2012.

After processing the received event according to the preset rule, the first application program processing module 2011 sends a processed event to the event distribution module 301, and the event distribution module 301 sends the processed event to the second application program processing module 2012 using a second application event processing node (for example, a node A that is connected to the second application program processing module 2012 in FIG. 2) in the first workflow, so that the second application program processing module 2012 processes the processed event according to a preset rule, where the second application event processing node is created in the first workflow by the event distribution module 301 according to an instruction of the second application program processing module 2012. That is, the second application program processing module 2012 creates the second application event processing node in the first workflow; after the event processed by the first application program processing module 2011 is returned to the event distribution module 301, the first application event processing node in the first workflow receives the event returned by the first application program processing module 2011 and sends the event to the second application event processing node; the second application event processing node sends the event to the second application program processing module 2012 for subsequent processing, thereby implementing event distribution in a scenario in which multiple application program processing modules perform cooperative processing, and further improving service distribution flexibility.

Alternatively, after processing the received event according to the preset rule, the first application program processing module 2011 sends a processed event to the event distribution module 301, and the event distribution module 301 sends the processed event to the second application program processing module 2012 using a second application event processing node in a second workflow, so that the second application program processing module 2012 processes the event according to a preset rule, where the second workflow is created by the event distribution module 301 according to an instruction of the second application program processing module 2012. That is, the second application program processing module 2012 creates the second workflow in the service distribution module; after the event processed by the first application program processing module 2011 is returned to the event distribution module 301, the first application event processing node in the first workflow receives the event returned by the first application program processing module 2011 and sends the event to the second application event processing node in the second workflow, and the event processed by the first application program processing module 2011 is sent to the second application program processing module 2012 using the second application event processing node in the second workflow for subsequent processing, thereby implementing event distribution in a scenario in which multiple application program processing modules perform cooperative processing, and further improving service distribution flexibility.

As an optional implementation manner, the event processing nodes in the first workflow include a root node and an application node, where the root node may be a node E in FIG. 2, and the application node may be the node A in FIG. 2; the root node is configured to receive the event sent by the device object generating module 401, and send the event to another processing node in the workflow; and the application node is configured to send the event that is processed using the workflow to the first application program processing module 2011.

Optionally, at least two event processing nodes in the first workflow form a tree structure in which the nodes are in sequence, where the root node is located at a root of the tree structure, and the application node is a node subordinate to the root node.

Optionally, the event processing nodes in the first workflow may further include a filter node, for example, a node F in FIG. 2, where the filter node is configured to set an event filtering rule, and match, according to the filtering rule, an event passing through the filter node; and if the event meets the filtering rule, send the event to a subnode of the filter node in the first workflow, for example, a node P in FIG. 2; or if the event does not meet the filtering rule, stop processing the event.

Herein, the filtering rule may include a matching field, a value field, and an expression, where the matching field is used to set an object to which the filtering rule applies; the value field is used to set a range of an attribute value corresponding to the matching field; and the expression is used to set a logical relationship between the matching field and the value field.

Optionally, the event processing nodes in the first workflow may further include a preprocessor node, for example, the node P in FIG. 2, where the preprocessor node is configured to preprocess an event, for example, add an event attribute by parsing information in the event. The preprocessor node may be between the root node and the application node in the tree structure, or may be between the root node and the filter node, or may further be between the filter node and the application node, to implement preprocessor of the event.

The foregoing event processing nodes (the root node, the filter node, the preprocessor node, and the application node) in the first workflow implement processing of the event using their respective functions and locations in the tree structure. The event processing nodes in the first workflow and the locations of the event processing nodes in the tree structure are created by a workflow management module 302 in the event distribution module 301 according to an instruction of the event distribution module 301, so that the event processed using the first workflow meets a requirement of the first application program processing module 2011, thereby overcoming disadvantages in the prior art that an event distribution mechanism is not flexible, and code needs to be modified when a newly added event is registered and a new event is generated because a new device is added.

Figure 3:
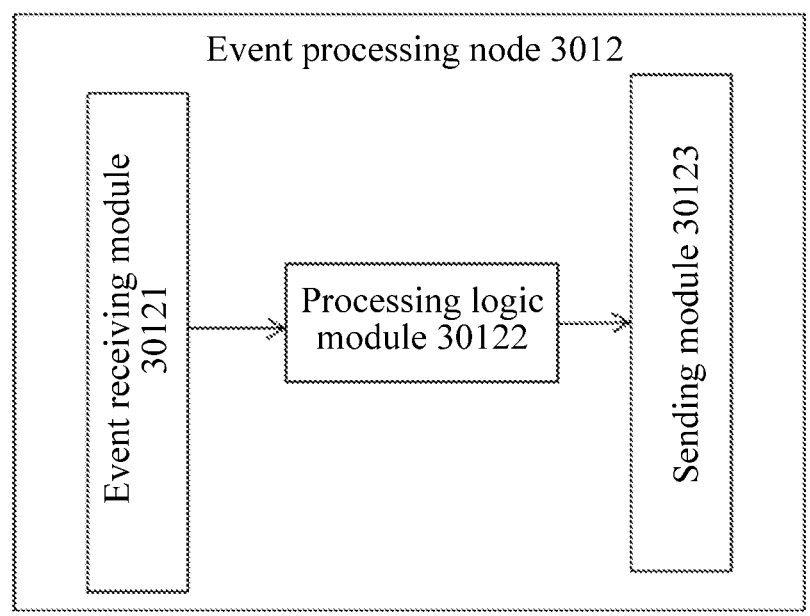
FIG. 3 is a schematic structural diagram of a service processing node according to an embodiment of the present invention.

Optionally, as shown in FIG. 3, FIG. 3 is a schematic structural diagram of a service processing node according to an embodiment of the present invention, where a service processing node 3012 may include an event receiving module 30121, a processing logic module 30122, and a sending module 30123, where the event receiving module 30121 is configured to receive an event from the device object generating module 401 or another service processing node; the processing logic module 30122 is configured to process, according to a preset rule, the event received by the event receiving module 30121; and the sending module 30123 is configured to send the event processed by the processing logic module 30122 to another node.

Optionally, the event processing node may further include an event queue, where the event queue is used to store the event received by the event receiving module.

The event in the foregoing embodiment may include an event header and an event body. The event header stores common information of the event in a form of a key-value pair, where the common information may be specific information that is included in all events, including but not limited to a source device ID of the event and/or a type of the event; the event body stores attribute information of the event in a form of a key-value pair. The attribute information of the event records content of the event. For example, for a device power outage event, its attribute information is information indicating power outage.

Using the foregoing event that is in a form of a key-value pair can normalize the event type, so that the application program processing module can identify all events, and can quickly read information about the events, which not only simplifies an event generating and processing mechanism, but also improves efficiency of the application program processing module in event reading and event processing.

As an optional implementation manner, the event may further include metadata, where the metadata includes at least one record, and the record is used to store a log of processing on the event by the first application program processing module 2011, or data of an update on a status of a switching device by the first application program processing module 2011. In this case, after the first application program processing module 2011 processes the event, a log of the processing is recorded; when the second application program processing module 2012 subsequently processes the event, the second application program processing module 2012 can perform further processing according to the recorded log, so that multiple application program processing modules cooperatively process the event more effectively, thereby improving efficiency of cooperative processing of the event.

The following describes in detail an implementation manner of a control device 101 on an SDN according to an embodiment of the present invention using a specific example.

Figure 4:
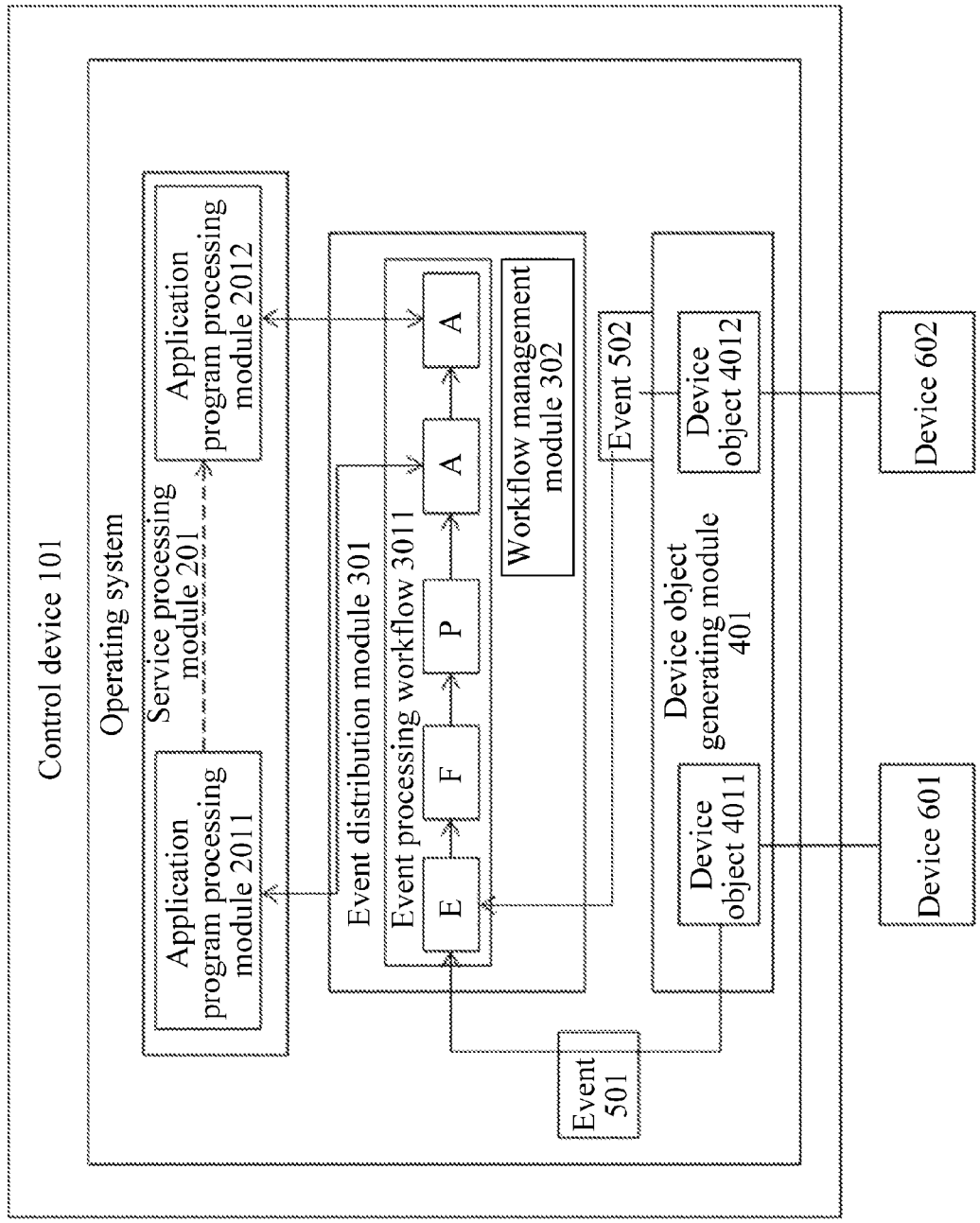
FIG. 4 is a schematic structural diagram of a control device 101 in a specific implementation manner on an SDN according to an embodiment of the present invention.

FIG. 4 is a schematic structural diagram of the control device 101 in a specific implementation manner on an SDN according to an embodiment of the present invention. In this embodiment, it is assumed that a control device is connected to two switching devices (a device 601 and a device 602). Herein the control device 101 includes an operating system running on the control device, and the service processing module 201, an event distribution module 301, and a device object generating module 401 may be implemented in the operating system.

The device object generating module 401 includes one or more device objects. A device object 4011 communicates with the device 601 using a communication protocol. When a status of the device 601 changes, a notification is sent to the device object 4011, and the device object 4011 encapsulates one event 501 and sends the event 501 to the event distribution module 301.

In this embodiment of the present invention, the device object is an agent, for controlling a network device, of a control device registered by the network device, for example, the device object 4011 is an agent of the control device 101 for controlling the device 601, and a device object 4012 is an agent of the control device 101 for controlling the device 602.

Similarly, the device object 4012 communicates with the device 602 using a communication protocol. When a status of the device 602 changes, a notification is sent to the device object 4012, and the device object 4012 encapsulates one event 502 and sends the event 502 to the event distribution module 301.

The event distribution module 301 includes one or more event processing workflows 3011, where the workflows may be managed using a workflow management module 302, including creation or deletion of the workflows, or addition, deletion, modification, or query of a node in the workflows, or the like. An application program processing module in the service processing module 201 may join the event processing workflows 3011 under the control of the workflow management module 302, so as to receive and process an event.

The service processing module 201 includes one or more application program processing modules (an application program processing module includes specific service processing logic, including but not limited to Layer 2 switching, Layer 3 routing, and the like). An application program processing module 2011 may create, using the workflow management module 302, a node (for example, a node A) in a first workflow 3011 that processes an event. As soon as the event reaches the node A, the event is sent to the application program processing module 2011. The application program processing module 2011 includes control logic, which may process the event according to a set rule.

Figure 5:
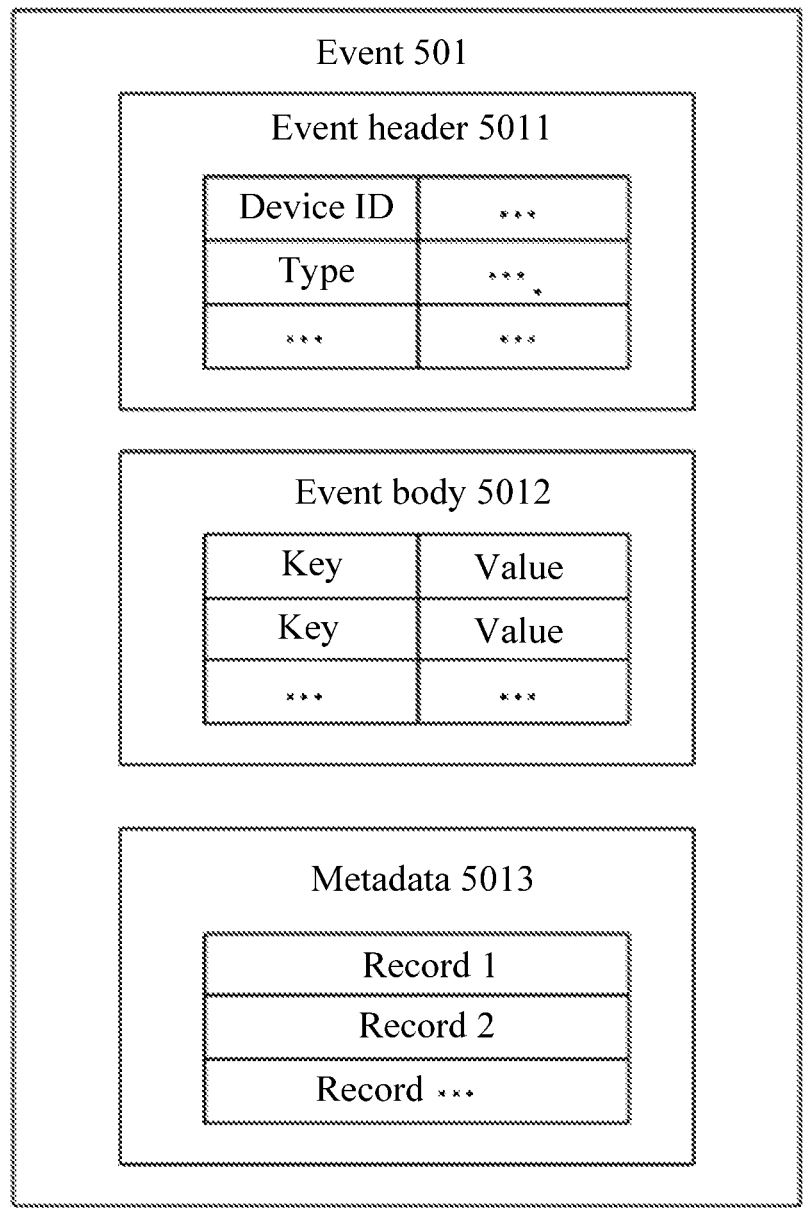
FIG. 5 is a schematic structural diagram of an event 501 in specific implementation according to an embodiment of the present invention.

FIG. 5 is a schematic structural diagram of an event 501 in specific implementation according to an embodiment of the present invention.

As an optional implementation manner, the event 501 may include an event header 5011. The event header 5011 stores common information of the event in a form of a key-value pair, where the common information refers to specific information that is included in all events, including but not limited to a source device ID of the event, a type of the event, and the like. When generating the event 501, a device object 601 fills the event header 5011 according to actual information (that is, fills a corresponding key with an actual value).

The event 501 may further include an event body 5012. The event body 5012 stores attribute information of the event in a form of a key-value pair. When generating the event 501, the device object 601 fills the event body 5012 according to actual information. The event body may specifically be a MAP or a dictionary, and multiple data records may exist in this data structure, where each data record may include one non-repetitive key and one corresponding value.

In this embodiment of the present invention, the event body 5012 may be extended, for example, an attribute is modified, added or deleted, or the like.

As an optional implementation manner, the event 501 may include metadata 5013. The metadata 5013 may include at least one record, where the record may be used to store a log (for example, a certain record is modified) of processing on the event by an application program processing module or data (for example, a flow table) of an update on a device status by the application program processing module, and these pieces of information may be read and used when the event is transmitted to a next application program processing module, thereby implementing a carrier for carrying information shared between different application program processing modules. When the device object generates the event, the metadata is initialized, and the record is empty.

Figure 6:
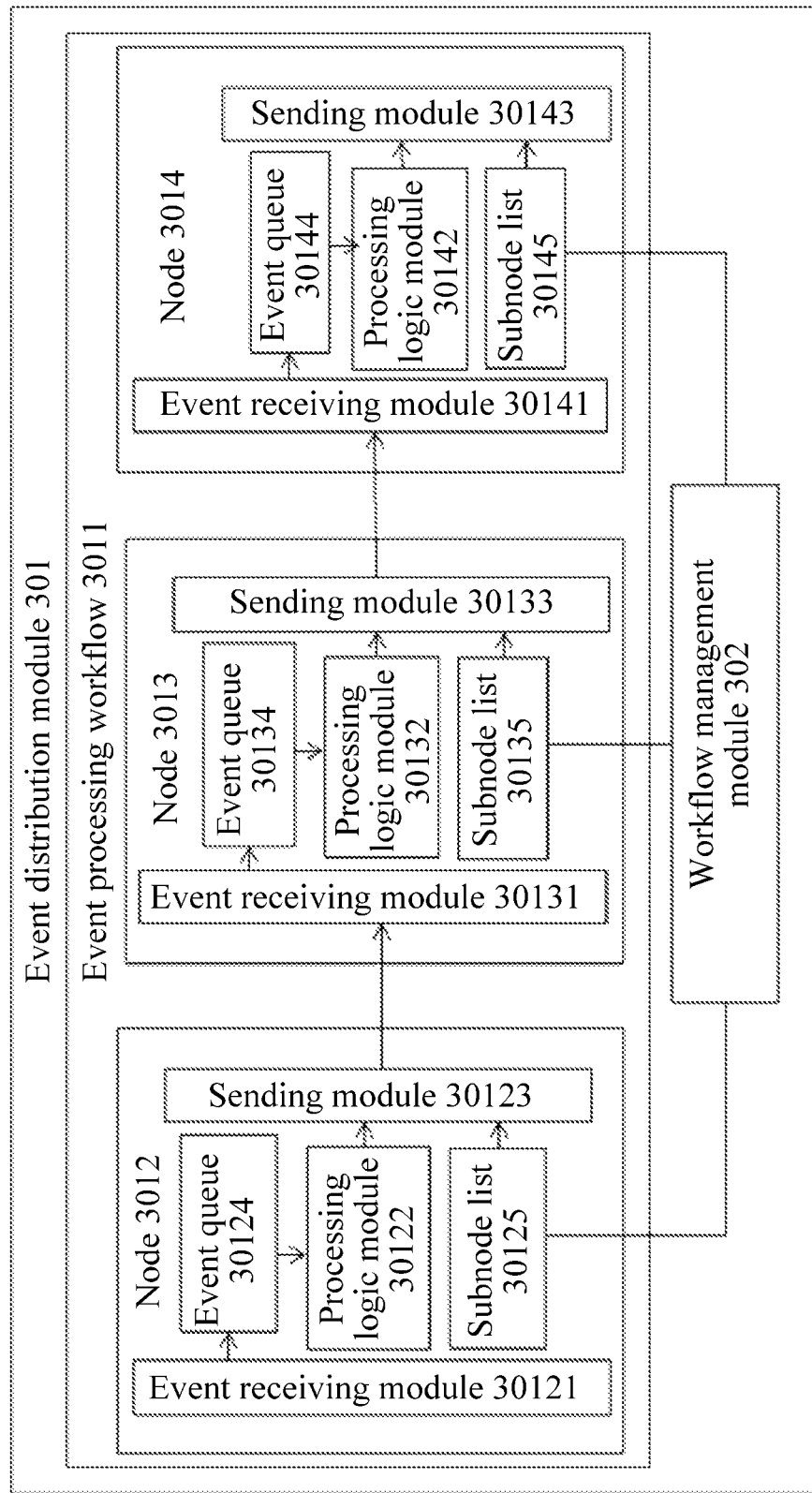
FIG. 6 is a schematic structural diagram of an event distribution module 301 in specific implementation according to an embodiment of the present invention.

FIG. 6 is a schematic structural diagram of an event distribution module 301 in specific implementation according to an embodiment of the present invention. In FIG. 6, a node 3012, a node 3013, and a node 3014 are all examples of a service processing node, and they may be one of a node E, a node F, a node P, and a node A. The nodes may be connected to each other, and their sequence is not limited, except that the node E is used as an ingress node.

The event distribution module 301 may include one or more event processing workflows. In FIG. 6, an event processing workflow 3011 is used as an example for description, where the event processing workflow 3011 may be the first workflow or the second workflow in the foregoing embodiments.

As an optional implementation manner, the event processing workflow 3011 may be managed by a workflow management module 302. A manner of managing the event processing workflow 3011 by the workflow management module 302 includes but is not limited to addition, deletion, modification, and query of a node.

The event processing workflow 3011 may include one or more nodes, for example, the node 3012, the node 3013, and the node 3014.

As an optional implementation manner, the node 3012 may include an event receiving module 30121, where the event receiving module 30121 may receive an event from a device object generating module; another node, for example, the node 3013 or the node 3014, may receive an event from other nodes.

The node 3012 may further include a processing logic module 30122, where the processing logic module 30122 may acquire an event from the event receiving module 30121, and process the event according to a preset rule, or discard the event, or directly forward the event.

The node 3012 further includes a sending module 30123, where the sending module 30123 is configured to send, to another node, an event that is processed by the processing logic module 30122 and needs to be further processed by the other node, for example, send the event to the node 3013.

Optionally, the node 3012 further includes an event queue 30124, and an event received by the node 3012 is stored in the event queue 30124.

As an optional implementation manner, the node 3012 may further include a subnode list 30125. The subnode list 30125 stores another node subordinate to a current node, for example, the node 3013 or the node 3014. After the event is processed by the node 3012, if the event needs to be further processed by another node, the sending module 30123 reads the event in the subnode list 30125, and sends the event to all nodes in the list.

The foregoing event queue 30124 and subnode list 30125 are optional in the node 3012, and the node 3012 may also independently implement functions of the node 3012 using the event receiving module 30121, the processing logic module 30122, and the sending module 30123.

In FIG. 6, structures of the node 3013 and the node 3014 are similar to a structure of the node 3012, and details are not described again.

Figure 7:
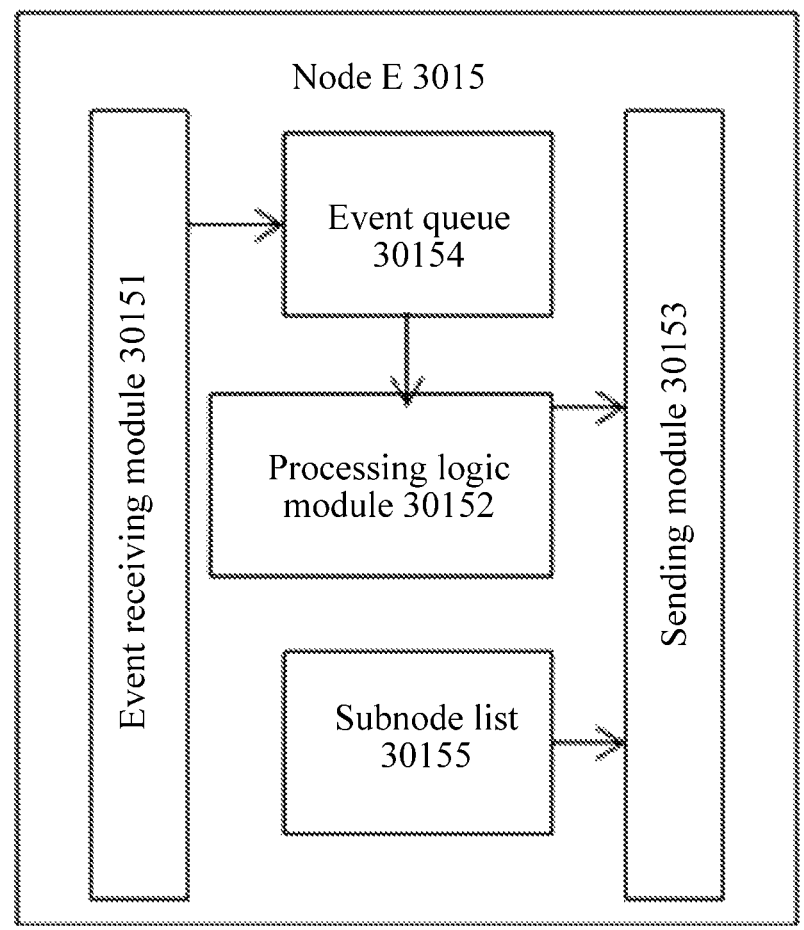
FIG. 7 is a specific schematic structural diagram of a node E in a specific implementation manner according to an embodiment of the present invention.

The node E in FIG. 4 is a root node of an event processing workflow, and all events enter the event processing workflow from the node E for distribution. FIG. 7 is a specific schematic structural diagram of the node E in a specific implementation manner (a node E 3015) according to an embodiment of the present invention.

As shown in FIG. 7, a processing logic module 30152 of the node E 3015 is only responsible for sending a received event to all other subnodes.

The node E 3015 is always used as the root node of the event processing workflow, and all the events enter the event processing workflow from the node E for distribution; therefore, some general processing on the events may be included in service processing logic of the node E, where the general processing may be user-defined processing, for example, the general processing may be adding a piece of header information to all the events.

The node F in FIG. 4 is a filter node, and the node F can filter events according to event attributes.

Figure 8:
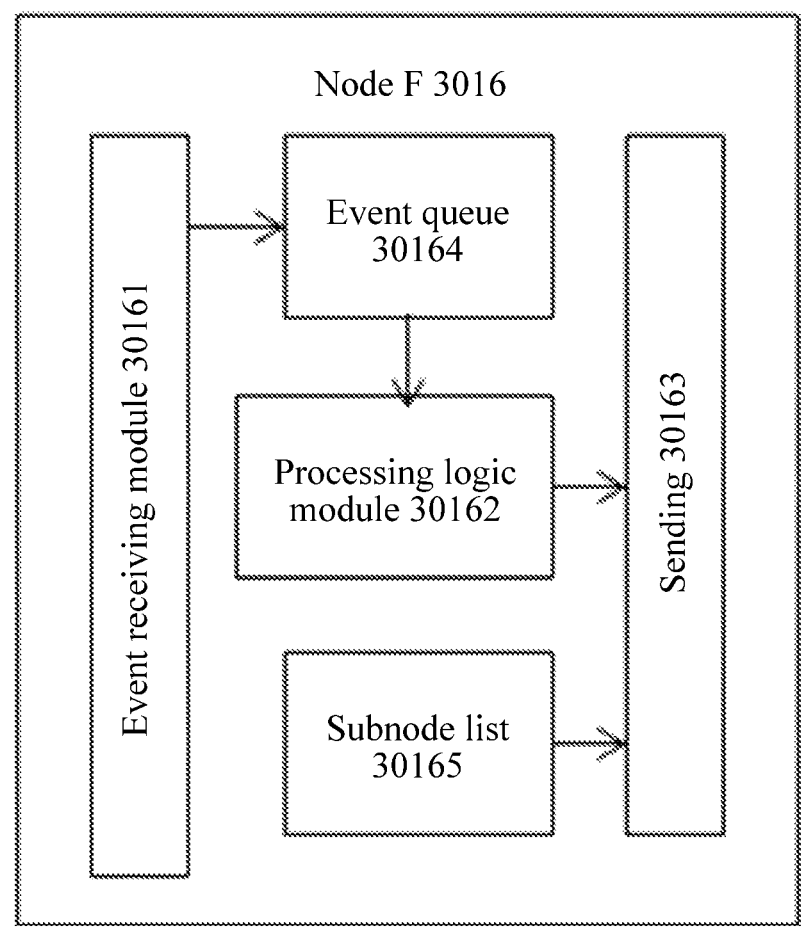
FIG. 8 is a specific schematic structural diagram of a node F in a specific implementation manner according to an embodiment of the present invention.

FIG. 8 is a specific schematic structural diagram of the node F in a specific implementation manner according to an embodiment of the present invention.

A processing logic module 30162 of a node F 3016 is configured to set an event filtering rule.

As an optional implementation manner, each rule may include the following 3 parts: a matching field, used to designate an object to which the rule is applied, that is, an attribute name of an event; a value field, used to designate a range of the attribute value corresponding to the matching field; and an expression, used to designate a logical relationship between the matching field and the value field, that is, an overlapping range of two intervals, namely, the matching field and the value field, for example, determine whether the matching field is greater than, or less than, or equal to, or not equal to the value field, or the like.

When an event passes through a node F, if all rules are met, the event is distributed to a subordinate node; if the rules are not met, an event processing procedure is terminated.

The node P in FIG. 4 is a preprocessor node and configured to preprocess an event, and may extend the event by parsing information in the event and then adding an event attribute.

Figure 9:
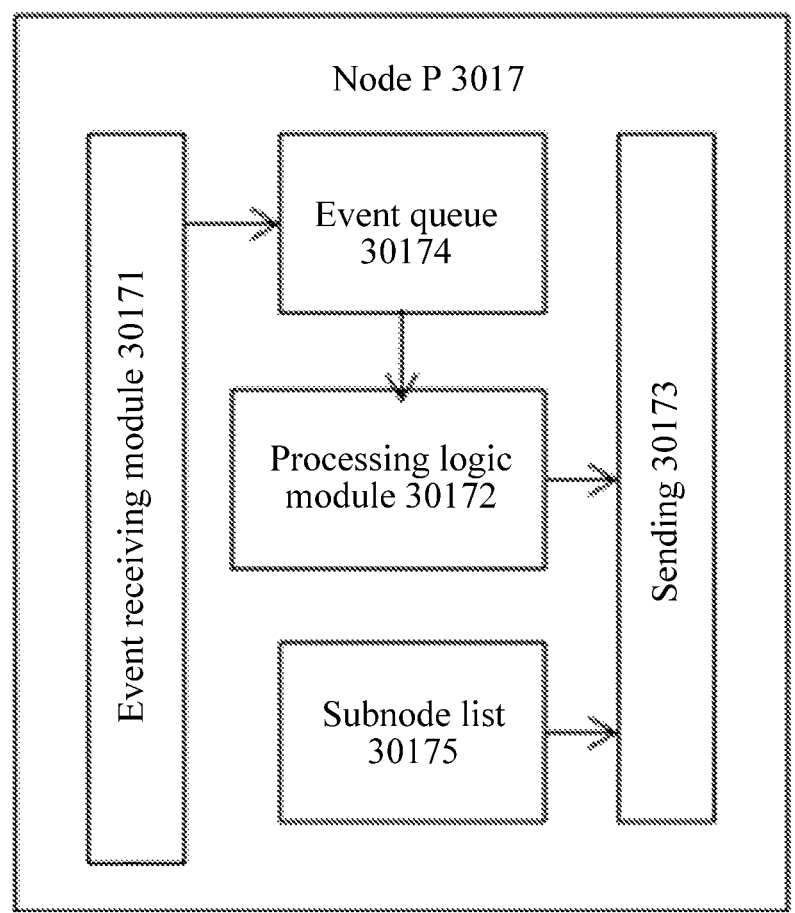
FIG. 9 is a schematic structural diagram of a node P in a specific implementation manner according to an embodiment of the present invention.

FIG. 9 is a specific schematic structural diagram of a node P in a specific implementation manner (a node P 3017) according to an embodiment of the present invention.

An event processing logic module 30172 of the node P 3017 may support extension processing of an event.

As an optional implementation manner, an event receiving module 30171 may read an event attribute, and further parse a value of the attribute. After a result of the parsing is attached to an event body of an existing event in a form of a key-value pair, attribute information of the event is thereby extended. For example, if the event attribute includes an IP packet, the packet may be read, an IP address and a port number of the packet is parsed, and the event is filled with the IP address and the port number of the packet.

The node A in FIG. 4 is an application node, which is an application program for processing an event.

Figure 10:
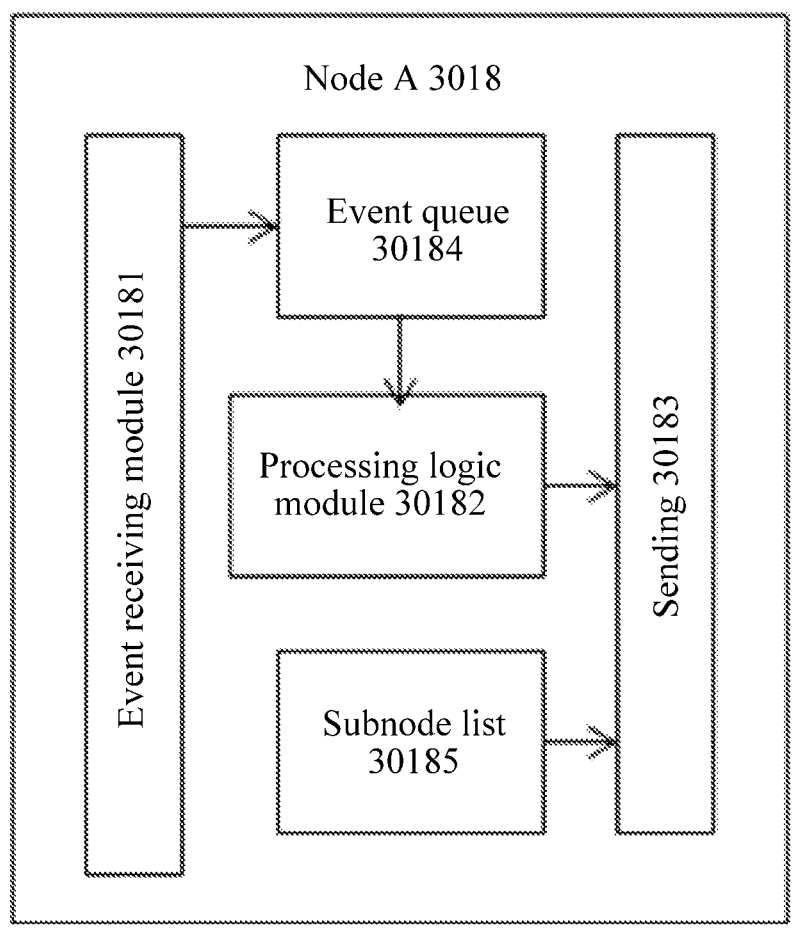
FIG. 10 is a schematic structural diagram of a node A in a specific implementation manner according to an embodiment of the present invention.

FIG. 10 is a specific schematic structural diagram of a node A in a specific implementation manner (a node A 3018) according to an embodiment of the present invention.

Event processing logic module 30182 of the node A includes a channel to an application program processing module 2011, and an event is sent to the application program processing module 2011 through this channel.

As an optional implementation manner, the channel may be implemented in a form of a callback function.

Figure 11:
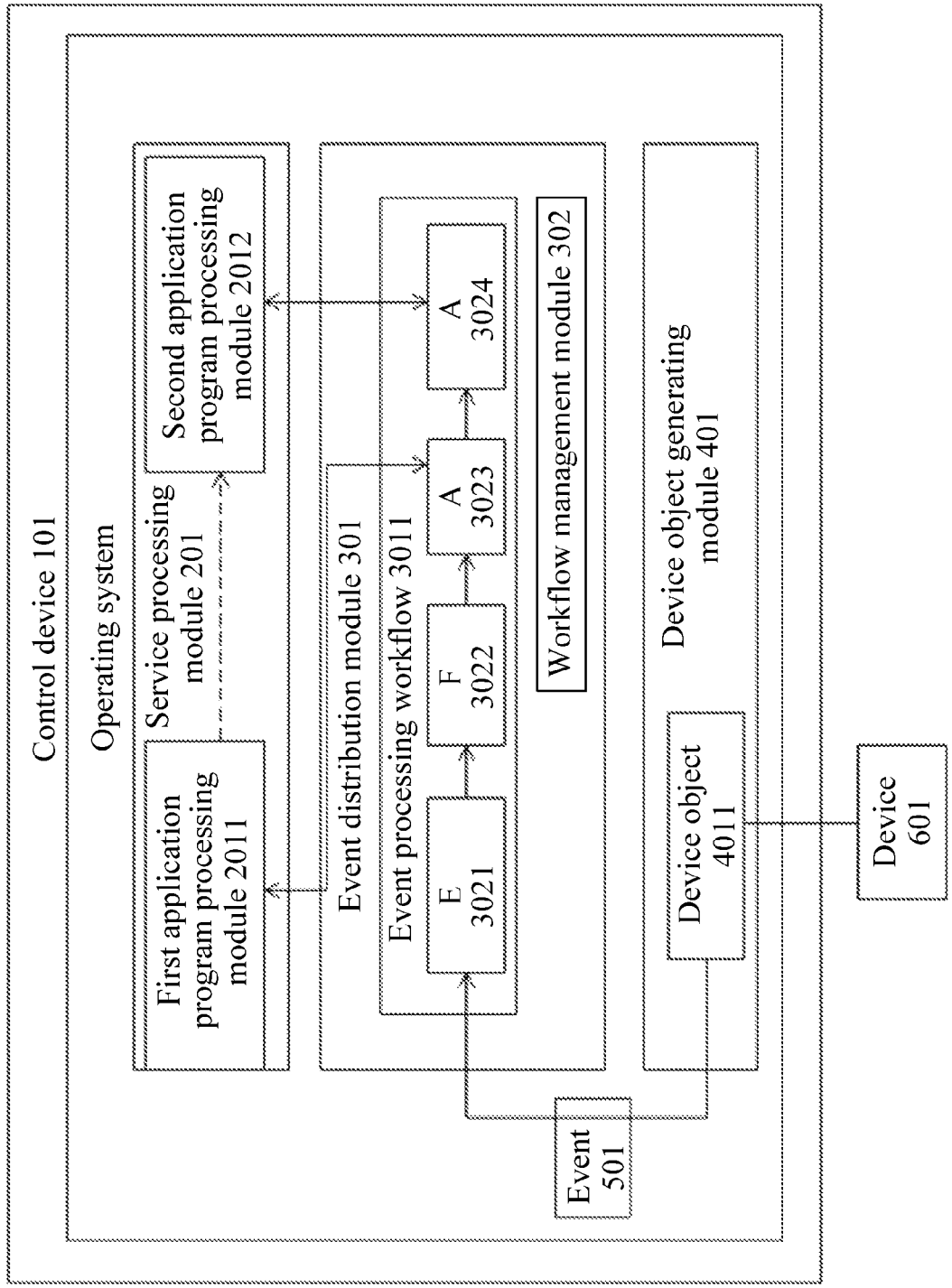
FIG. 11 is a schematic structural diagram of a control device 101 in specific implementation of an event distribution implementation manner according to an embodiment of the present invention.

FIG. 11 is a schematic structural diagram of a control device 101 in specific implementation of an event distribution implementation manner according to an embodiment of the present invention.

In this embodiment, a device 601 is an OpenFlow switch, an application program processing module 2011 serves a Layer 3 route, and an application program processing module 2012 is a Layer 2 application program processing module. A computer that is connected to the device 601 initiates a communication request, and the request needs to sequentially pass through the application program processing module 2011; it is determined whether the request is a Layer 3 communication requirement and whether the communication is permitted, and subsequently the request is processed by the application program processing module 2012.

A workflow management module 302 creates, according to an instruction of the first application program processing module 2011, a node E 3021 as a new event processing workflow, as a new event processing workflow, and creates a node F 3022 after the node E 3021, where the node F 3022 is configured to filter events to find an event whose event type is PACKET_IN because the application program processing module needs to process the PACKET_IN event to acquire address information of two parties in communication; a node A 3023 is created after the node F 3022 and is configured to distribute an event to the application program processing module 2011. The workflow management module 302 further creates a node A 3024 after the node A 3023 according to an instruction of the second application program processing module 2012, where the node A 3024 is configured to distribute an event to the application program processing module 2012.

A computer connected to the device 601 initiates a communication request; after receiving the request, the device 601 notifies a device object 4011; the device object 4011 generates a new event 501, where an event type is PACKET_IN, and a device ID is an ID of the device 601; the event 501 is sent to the node E 3021; the node E 3021 sends the event 501 to the node F 3022; the node F 3022 performs rule matching; if the event type is consistent with an expectation, the rule matching succeeds, and the event 501 is sent to the node A 3023.

The node A 3023 sends the event to the application program processing module 2011, and the application program processing module 2011 determines that the event indicates cross-subnet communication, adds a record of a flow table to metadata of the event 501, and returns the event to the node A 3023.

The node A 3023 sends the event to the node A 3024; the node A 3024 sends the event to the application program processing module 2012; the application program processing module 2012 reads the record of the flow table in the metadata of the event 501, reads other attributes of the event 501, and generates a new flow table, and the two flow tables are combined and delivered to the device object 4011.

The device object 4011 delivers the flow table through a communication channel between the device object 4011 and the device 601; the communication request of the computer that is connected to the device 601 is processed.

Figure 12:
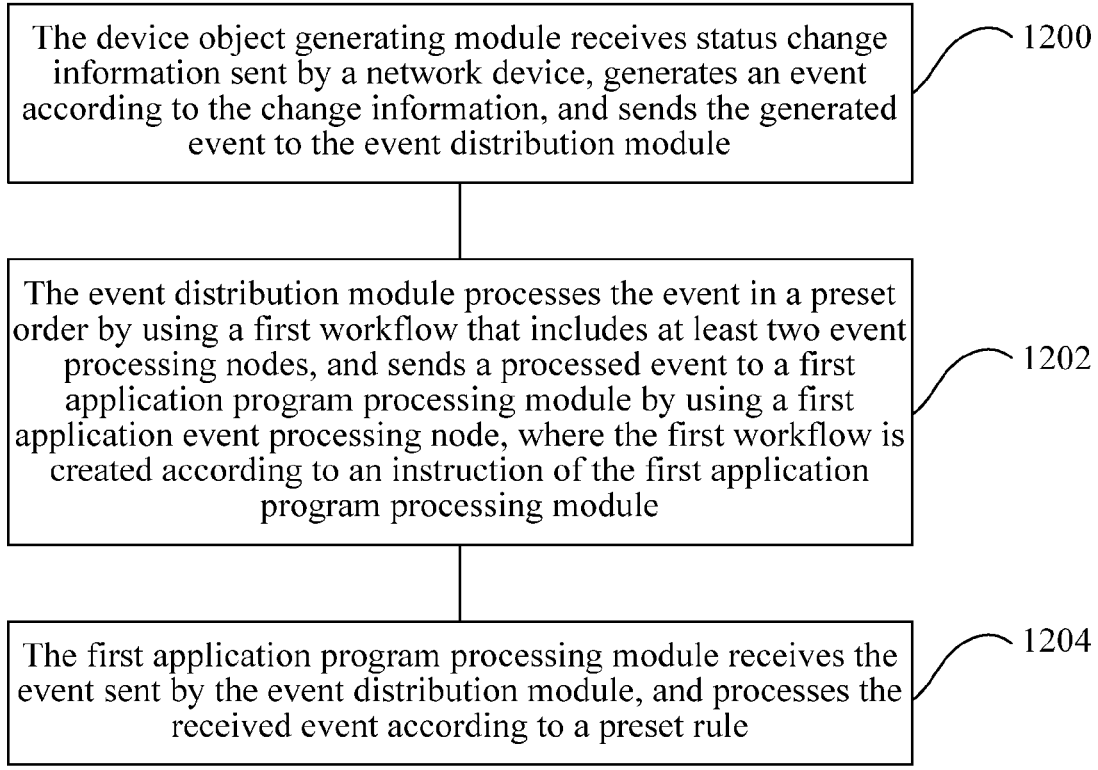
FIG. 12 is a schematic flowchart of an event distribution on a SDN according to an embodiment of the present invention.

FIG. 12 is a schematic flowchart of an event distribution method on a SDN according to an embodiment of the present invention, where the method is applied to a control device that includes a first application program processing module, an event distribution module, and a device object generating module. As shown in FIG. 12, the method includes the following steps:

Step 1200. The device object generating module receives status change information sent by a network device, generates an event according to the change information, and sends the generated event to the event distribution module.

Step 1202. The event distribution module processes the event in a preset order using a first workflow that includes at least two event processing nodes, and sends a processed event to the first application program processing module using a first application event processing node, where the first workflow is created according to an instruction of the first application program processing module.

Step 1204. The first application program processing module receives the event sent by the event distribution module, and processes the received event according to a preset rule.

According to the foregoing description, an event distribution module processes, in a preset order using a first workflow that includes at least two event processing nodes, an event that is generated by a device object generating module, and sends a processed event to a first application program processing module using a first application event processing node. The first workflow is created according to an instruction of the first application program processing module, so that the event that is sent to the first application program processing module can be processed according to the instruction of the first application program processing module. Therefore, the event that is sent to the first application program processing module does not need to meet a predetermined format or requirement; when a new event is generated because a new device is added, the first application program processing module can process any event that passes through the first workflow. In this way, code does not need to be modified to adapt to the newly added event, thereby improving flexibility of event distribution.

As an optional implementation manner, the control device further includes a second application program processing module; the method further includes, after processing the received event according to the preset rule, sending, by the first application program processing module, a processed event to the service distribution module; sending, by the service distribution module, the processed event to the second application program processing module using a second application event processing node in the first workflow; and processing, by the second application program processing module, the processed event according to a preset rule, where the second application event processing node is created in the first workflow by the event distribution module 301 according to an instruction of the second application program processing module.

Optionally, the event distribution module may further send the processed event to the second application program processing module using a second application event processing node in a second workflow; and the second application program processing module processes the event according to a preset rule, where the second workflow is created by the event distribution module according to an instruction of the second application program processing module.

The event is sent to the second application program processing module using the foregoing second application event processing node for subsequent processing, thereby implementing event distribution in a scenario in which multiple application program processing modules perform cooperative processing, and further improving service distribution flexibility.

In the event distribution method on an SDN according to this embodiment of the present invention, the event processing nodes in the first workflow include a root node and an application node, where the root node is configured to receive the event sent by the device object generating module, and send the event to another processing node in the workflow; and the application node is configured to send the event that is processed using the workflow to the first application program processing module.

The event processing nodes in the first workflow may further include a filter node, where the filter node is configured to set an event filtering rule, and match, according to the filtering rule, an event passing through the filter node; and if the event meets the filtering rule, send the event to a subnode of the filter node in the first workflow; or if the event does not meet the filtering rule, stop processing the event.

The filtering rule includes a matching field, a value field, and an expression, where the matching field is used to set an object to which the filtering rule applies; the value field is used to set a range of an attribute value corresponding to the matching field; and the expression is used to set a logical relationship between the matching field and the value field.

The event processing nodes in the first workflow may further include a preprocessor node, where the preprocessor node is configured to preprocess an event, and add an event attribute by parsing information in the event. Herein, at least two event processing nodes in the first workflow form a tree structure in which the nodes are in sequence.

The foregoing event processing nodes (the root node, the filter node, the preprocessor node, and the application node) in the first workflow implement processing of the event using their respective functions and locations in the tree structure. The event processing nodes in the first workflow and the locations of the event processing nodes in the tree structure are created by a workflow management module in the event distribution module according to an instruction of the event distribution module, so that the event processed using the first workflow meets a requirement of the first application program processing module, thereby overcoming disadvantages in the prior art that an event distribution mechanism is not flexible, and code needs to be modified when a newly added event is registered and a new event is generated because a new device is added.

As an optional implementation manner, the event processing node includes an event receiving module, a processing logic module, and a sending module, where the event receiving module is configured to receive an event from the device object generating module or another service processing node; the processing logic module is configured to process, according to a preset rule, the event received by the event receiving module; and the sending module is configured to send the event processed by the processing logic module to another node.

In the event distribution method on an SDN according to this embodiment of the present invention, the event may include an event header and an event body; the event header stores common information of the event in a form of a key-value pair, where the common information is specific information that is included in all events; the event body stores attribute information of the event in a form of a key-value pair. The common information includes a source device ID of the event and/or a type of the event.

As an optional implementation manner, the event may further include metadata, where the metadata includes at least one record, and the record is used to store a log of processing on the event by the first application program processing module, or data of an update on a status of a switching device by the first application program processing module.

Using the foregoing event that is in a form of a key-value pair can normalize the event type, so that the application program processing module can identify all events, and can quickly read information about the events, which not only simplifies an event generating and processing mechanism, but also improves efficiency of the application program processing module in event reading and event processing.

For implementation of a specific implementation manner of the foregoing processor, reference may further be made to the implementation manner of the control device in the embodiments described in FIG. 4 to FIG. 10 and a specific implementation manner in FIG. 11, and details are not described herein again.

An embodiment of the present invention further provides a processor on a SDN, where the processor is located in a control device on the SDN, and the processor includes a service processing module, an event distribution module, and a device object generating module, where the service processing module includes a first application program processing module; the event distribution module is configured to receive an event generated by the device object generating module, process the event in a preset order using a first workflow that includes at least two event processing nodes, and send a processed event to the first application program processing module using a first application event processing node, where the first workflow is created according to an instruction of the first application program processing module; the first application program processing module is configured to receive the event sent by the event distribution module, and process the received event according to a preset rule; and the device object generating module is configured to receive status change information sent by a network device, generate the event according to the change information, and send the generated event to the event distribution module.

According to the foregoing description, an event distribution module processes, in a preset order using a first workflow that includes at least two event processing nodes, an event that is generated by a device object generating module, and sends a processed event to a first application program processing module using a first application event processing node. The first workflow is created according to an instruction of the first application program processing module, so that the event that is sent to the first application program processing module can be processed according to the instruction of the first application program processing module. Therefore, the event that is sent to the first application program processing module does not need to meet a predetermined format or requirement; when a new event is generated because a new device is added, the first application program processing module can process any event that passes through the first workflow. In this way, code does not need to be modified to adapt to the newly added event, thereby improving flexibility of event distribution.

As an optional implementation manner, the service processing module in the processor further includes a second application program processing module; and after processing the received event according to the preset rule, the first application program processing module sends a processed event to the service distribution module, and the event distribution module sends the processed event to the second application program processing module using a second application event processing node in the first workflow, so that the second application program processing module processes the processed event according to a preset rule, where the second application event processing node is created in the first workflow by the event distribution module according to an instruction of the second application program processing module.

Optionally, after processing the received event according to the preset rule, the first application program processing module sends a processed event to the service distribution module, and the event distribution module sends the processed event to the second application program processing module using a second application event processing node in a second workflow, so that the second application program processing module processes the event according to a preset rule, where the second workflow is created by the event distribution module according to an instruction of the second application program processing module.

In the foregoing manner, the second application event processing node sends the event to the second application program processing module for subsequent processing, thereby implementing event distribution in a scenario in which multiple application program processing modules perform cooperative processing, and further improving service distribution flexibility.

The event distribution module in the processor may further include a workflow management module, where the workflow management module is configured to create the first workflow according to the instruction of the first application program processing module; or create the second workflow according to the instruction of the second application program processing module.

In this embodiment of the present invention, the event processing nodes in the first workflow in the processor include a root node and an application node, where the root node is configured to receive the event sent by the device object generating module, and send the event to another processing node in the workflow; and the application node is configured to send the event that is processed using the workflow to the first application program processing module.

The event processing nodes in the first workflow may further include a filter node, where the filter node is configured to set an event filtering rule, and match, according to the filtering rule, an event passing through the filter node; and if the event meets the filtering rule, send the event to a subnode of the filter node in the first workflow; or if the event does not meet the filtering rule, stop processing the event. The filtering rule includes a matching field, a value field, and an expression, where the matching field is used to set an object to which the filtering rule applies; the value field is used to set a range of an attribute value corresponding to the matching field; and the expression is used to set a logical relationship between the matching field and the value field.

The event processing nodes in the first workflow may further include a preprocessor node, where the preprocessor node is configured to preprocess an event, and add an event attribute by parsing information in the event. At least two event processing nodes in the first workflow form a tree structure in which the nodes are in sequence.

Optionally, the event processing node in the processor includes an event receiving module, a processing logic module, and a sending module, where the event receiving module is configured to receive an event from the device object generating module or another service processing node; the processing logic module is configured to process, according to a preset rule, the event received by the event receiving module; and the sending module is configured to send the event processed by the processing logic module to another node.

In the processor on an SDN according to this embodiment of the present invention, the event includes an event header and an event body; the event header stores common information of the event in a form of a key-value pair, where the common information is specific information that is included in all events; the event body stores attribute information of the event in a form of a key-value pair. The common information includes a source device ID of the event and/or a type of the event.

The event may further include metadata, where the metadata includes at least one record, and the record is used to store a log of processing on the event by the first application program processing module, or data of an update on a status of a switching device by the first application program processing module.

For implementation of a specific implementation manner of the foregoing processor, reference may further be made to the implementation manner of the control device in the embodiments described in FIG. 4 to FIG. 10 and a specific implementation manner in FIG. 11, and details are not described herein again.

An embodiment of the present invention further provides a computer program product, and the computer program product can perform the steps listed in the embodiment of the foregoing event distribution method on an SDN, and achieve technical effects that are achieved by the foregoing event distribution method.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A control device on a software-defined network (SDN), wherein the control device comprises:
a service processing module;
an event distributor; and
a device object generating module, wherein the service processing module comprises a first application program processing module, wherein the event distributor is configured to:
receive an event generated by the device object generating module, wherein the event comprises an event header and an event body, wherein the event header stores common information of the event in a form of a key-value pair, wherein the common information is specific information that is part of all events, and wherein the event body stores attribute information of the event in a form of a key-value pair;
process the event in a preset order using a first workflow that comprises at least two event processing nodes; and
send a processed event to the first application program processing module using a first event processing node, wherein the first workflow is created according to an instruction of the first application program processing module,
wherein the first application program processing module is configured to:
receive the event sent by the event distributor; and
process the event according to a preset rule;
wherein the device object generating module is configured to:
receive status change information sent by a network device;
generate the event according to the status change information; and
send the event to the event distributor; and
wherein the service processing module, the event distributor, and the device object generating module are software.

2. The control device on an SDN according to claim 1, wherein the service processing module further comprises a second application program processing module, and wherein, after processing the received event according to the preset rule, the first application program processing module sends a processed event to the event distributor, and the event distributor sends the processed event to the second application program processing module using a second event processing node in the first workflow, so that the second application program processing module processes the processed event according to a preset rule, wherein the second event processing node is created in the first workflow by the event distributor according to an instruction of the second application program processing module.

3. The control device on an SDN according to claim 1, wherein the service processing module further comprises a second application program processing module, and wherein, after processing the received event according to the preset rule, the first application program processing module sends a processed event to the event distributor, and the event distribution sends the processed event to the second application program processing module using a second event processing node in a second workflow, so that the second application program processing module processes the event according to a preset rule, wherein the second workflow is created by the event distributor according to an instruction of the second application program processing module.

4. The control device on an SDN according to claim 3, wherein the event distributor further comprises a workflow management module, and wherein the workflow management module is configured to:
create the first workflow according to the instruction of the first application program processing module; or
create the second workflow according to the instruction of the second application program processing module.

5. The control device on an SDN according to claim 1, wherein the event processing nodes in the first workflow comprise a root node and an application node, wherein the root node is configured to:
receive the event sent by the device object generating module; and
send the event to another processing node in the first workflow, and wherein the application node is configured to send the event that is processed using the first workflow to the first application program processing module.

6. The control device on an SDN according to claim 4, wherein the event processing nodes in the first workflow further comprise a filter node, wherein the filter node is configured to:
set a filtering rule;
match, according to the filtering rule, an event passing through the filter node;
send the event to a subnode of the filter node in the first workflow when the event meets the filtering rule; and
stop processing the event when the event does not meet the filtering rule.

7. The control device on an SDN according to claim 6, wherein the filtering rule comprises a matching field, a value field, and an expression, wherein the matching field is used to set an object to which the filtering rule applies, wherein the value field is used to set a range of an attribute value corresponding to the matching field, and wherein the expression is used to set a logical relationship between the matching field and the value field.

8. The control device on an SDN according to claim 5, wherein the event processing nodes in the first workflow further comprise a preprocessor node, and wherein the preprocessor node is configured to preprocess an event, and add an event attribute by parsing information in the event.

9. The control device on an SDN according to claim 5, wherein at least two event processing nodes in the first workflow form a tree structure in which the even processing nodes are in sequence.

10. The control device on an SDN according to claim 1, wherein the first event processing node comprises an event receiving module, a processing logic module, and a sending module, wherein the event receiving module is configured to receive an event from the device object generating module or another service processing node, wherein the processing logic module is configured to process, according to a preset rule, the event received by the event receiving module, and wherein the sending module is configured to send the event processed by the processing logic module to another node.

11. The control device on an SDN according to claim 1, wherein the common information comprises a source device identifier (ID) of the event or a type of the event.

12. The control device on an SDN according to claim 1, wherein the event further comprises metadata, wherein the metadata comprises at least one record, wherein the record is used to store a log of processing on the event by the first application program processing module, or data of an update on a status of a switching device by the first application program processing module.

13. An event distribution method on a software-defined network (SDN), wherein the method is applied to a control device that comprises a first application program processing module, an event distribution module, and a device object generating module, the event distribution method comprising:
    receiving, by the device object generating module, status change information sent by a network device;
    generating, by the device object generating module, an event according to the status change information, wherein the event comprises an event header and an event body, wherein the event header stores common information of the event in a form of a key-value pair, wherein the common information is specific information that is part of all events, and wherein the event body stores attribute information of the event in a form of a key-value pair;
    sending, by the device object generating module, the event to the event distribution module;
    processing, by the event distribution module, the event in a preset order using a first workflow that comprises at least two event processing nodes;
    sending, by the event distribution module, a processed event to the first application program processing module using a first application event processing node, wherein the first workflow is created according to an instruction of the first application program processing module;
    receiving, by the first application program processing module, the event sent by the event distribution module; and
    processing, by the first application program processing module, the event according to a preset rule.

14. The event distribution method on an SDN according to claim 13, wherein the control device further comprises a second application program processing module, wherein, after processing the received event according to the preset rule, the first application program processing module sends a processed event to a service distribution module, wherein the event distribution module sends the processed event to the second application program processing module using a second event processing node in the first workflow, and wherein the second application program processing module processes the processed event according to a preset rule, wherein the second event processing node is created in the first workflow by the event distribution module according to an instruction of the second application program processing module.

15. The event distribution method on an SDN according to claim 13, wherein a service processing module further comprises a second application program processing module, wherein, after processing the received event according to the preset rule, the first application program processing module sends a processed event to a service distribution module, wherein the event distribution module sends the processed event to the second application program processing module using a second event processing node in a second workflow, and wherein the second application program processing module processes the event according to a preset rule, wherein the second workflow is created by the event distribution module according to an instruction of the second application program processing module.

16. The event distribution method on an SDN according to claim 13, wherein the event processing nodes in the first workflow comprise a root node and an application node, wherein the root node is configured to receive the event sent by the device object generating module, and send the event to another processing node in the first workflow, and wherein the application node is configured to send the event that is processed using the first workflow to the first application program processing module.

17. The even distribution method on an SDN according to claim 16, wherein the event processing nodes in the first workflow further comprise a filter node, wherein the filter node is configured to:
    set a filtering rule;
    match, according to the filtering rule, an event passing through the filter node;
    send the event to a subnode of the filter node in the first workflow when the event meets the filtering rule; and
    stop processing the event when the event does not meet the filtering rule.

18. The event distribution method on an SDN according to claim 17, wherein the filtering rule comprises a matching field, a value field, and an expression, wherein the matching field is used to set an object to which the filtering rule applies, wherein the value field is used to set a range of an attribute value corresponding to the matching field, and wherein the expression is used to set a logical relationship between the matching field and the value field.

19. The event distribution method on an SDN according to claim 16, wherein the event processing nodes in the first workflow further comprise a preprocessor node, and wherein the processor node is configured to preprocess an event, and add an event attribute by parsing information in the event.

20. The event distribution method on an SDN according to claim 16, wherein at least two event processing nodes in the first workflow form a tree structure in which the event processing nodes are in sequence.

21. The event distribution method on an SDN according to claim 13, wherein the first event processing node comprises an event receiving module, a processing logic module, and a sending module, wherein the event receiving module is configured to receive an event from the device object generating module or another service processing node, wherein the processing logic module is configured to process, according to a preset rule, the event received by the event receiving module, and wherein the sending module is configured to send the event processed by the processing logic module to another node.

22. The event distribution method on an SDN according to claim 13, wherein the common information comprises a source device identifier (ID) of the event and/or a type of the event.

23. The event distribution method on an SDN according to claim 13, wherein the event further comprises metadata, wherein the metadata comprises at least one record, wherein the record is used to store a log of processing on the event by the first application program processing module, or data of an update on a status of a switching device by the first application program processing module.

24. A processor on a software-defined network (SDN), wherein the processor is located in a control device on the SDN, wherein the processor is hardware, and wherein the processor is configured to execute:
    a service processing module;
    an event distributor; and
    a device object generating module,
    wherein the service processing module comprises a first application program processing module, wherein the event distributor is configured to receive an event generated by the device object generating module, wherein the event comprises an event header and an event body, wherein the event header stores common information of the event in a form of a key-value pair, wherein the common information is specific information that is part of all events, wherein the event body stores attribute information of the event in a form of a key-value pair, process the event in a preset order using a first workflow that comprises at least two event processing nodes, and send a processed event to the first application program processing module using a first event processing node, wherein the first workflow is created according to an instruction of the first application program processing module, wherein the first application program processing module is configured to receive the event sent by the event distributor, and process the event according to a preset rule, wherein the device object generating module is configured to receive status change information sent by a network device, generate the event according to the status change information, and send the event to the event distributor, and wherein the service processing module, the event distributor, and the device object generating module are software.

25. The processor on an SDN according to claim 24, wherein the service processing module further comprises a second application program processing module, and wherein, after processing the received event according to the preset rule, the first application program processing module sends a processed event to the event distributor, and the event distributor sends the processed event to the second application program processing module using a second event processing node in the first workflow, so that the second application program processing module processes the processed event according to a preset rule, wherein the second event processing node is created in the first workflow by the event distributor according to an instruction of the second application program processing module.

26. The processor on an SDN according to claim 24, wherein the service processing module further comprises a second application program processing module, and wherein, after processing the received event according to the preset rule, the first application program processing module sends a processed event to a service distribution module, and wherein the event distributor sends the processed event to the second application program processing module using a second event processing node in a second workflow, so that the second application program processing module processes the event according to a preset rule, wherein the second workflow is created by the event distributor according to an instruction of the second application program processing module.

27. The processor on an SDN according to claim 26, wherein the event distributor further comprises a workflow management module, wherein the workflow management module is configured to create the first workflow according to the instruction of the first application program processing module; or create the second workflow according to the instruction of the second application program processing module.

28. The processor on an SDN according to claim 24, wherein the event processing nodes in the first workflow comprise a root node and an application node, wherein the root node is configured to receive the event sent by the device object generating module, and send the event to another processing node in the first workflow, and wherein the application node is configured to send the event that is processed using the first workflow to the first application program processing module.

29. The processor on an SDN according to claim 28, wherein the event processing nodes in the first workflow further comprise a filter node, wherein the filter node is configured to:
set a filtering rule;
match, according to the filtering rule, an event passing through the filter node;
send the event to a subnode of the filter node in the first workflow when the event meets the filtering rule; and
stop processing the event when the event does not meet the filtering rule.

30. The processor on an SDN according to claim 29, wherein the filtering rule comprises a matching field, a value field, and an expression, wherein the matching field is used to set an object to which the filtering rule applies, wherein the value field is used to set a range of an attribute value corresponding to the matching field, and wherein the expression is used to set a logical relationship between the matching field and the value field.

31. The processor on an SDN according to claim 28, wherein the event processing nodes in the first workflow further comprise a preprocessor node, wherein the preprocessor node is configured to preprocess an event, and add an event attribute by parsing information in the event.

32. The processor on an SDN according to claim 28, wherein at least two event processing nodes in the first workflow form a tree structure in which the event processing nodes are in sequence.

33. The processor on an SDN according to claim 24, wherein the first event processing node comprises an event receiving module, a processing logic module, and a sending module, wherein the event receiving module is configured to receive an event from the device object generating module or another service processing node, wherein the processing logic module is configured to process, according to a preset rule, the event received by the event receiving module, and wherein the sending module is configured to send the event processed by the processing logic module to another node.

34. The processor on an SDN according to claim 24, wherein the common information comprises a source device identifier (ID) of the event and/or a type of the event.

35. The processor on an SDN according to claim 24, wherein the event further comprises metadata, wherein the metadata comprises at least one record, wherein the record is used to store a log of processing on the event by the first application program processing module, or data of an update on a status of a switching device by the first application program processing module.

36. A control device in a software-defined networking (SDN) network, the control device comprising:
a device object generating module configured to:
receive status change information from a network device, and
generate an event according to the status change information, wherein the event comprises an event header and an event body, wherein the event header stores common information of the event in a form of a key-value pair, wherein the common information is specific information that is part of all events, and wherein the event body stores attribute information of the event in a form of a key-value pair;
an event distributor comprising a first event processing node, comprising a second event processing node, and configured to:
receive the event from the device object generating module,
create a first workflow comprising at least the first event processing node and the second event processing node,
process the event in a preset order using the first workflow to produce a processed event, and
send the processed event using the first event processing node; and
a service processing module configured to:
generate an instruction for the event distributor to create the first workflow,
receive the processed event from the first event processing node, and
further process the processed event according to a preset rule,
wherein the device object generating module, the event distributor, and the service processing module are software.

37. A method implemented in a control device in a software-defined networking (SDN) network, the method comprising:
receiving, by a device object generating module of the control device, status change information from a network device;
generating, by the device object generating module, an event according to the status change information, wherein the event comprises an event header and an event body, wherein the event header stores common information of the event in a form of a key-value pair, wherein the common information is specific information that is part of all events, and wherein the event body stores attribute information of the event in a form of a key-value pair;
receiving, by an event distributor of the control device, the event from the device object generating module;
creating, by the event distributor and based on an instruction from a service processing module of the control device, a first workflow comprising at least a first event processing node and a second event processing node of the event distributor;
processing, by the event distributor, the event in a preset order using the first workflow to produce a processed event;
sending, by the event distributor, the processed event to the service processing module using the first event processing node;
receiving, by the service processing module, the processed event from the first event processing node; and
further processing, by the service processing module, the processed event according to a preset rule.

* * * * *

UNITED STATES PATENT AND TRADEMARK OFFICE
CERTIFICATE OF CORRECTION

PATENT NO. : 9,832,255 B2
APPLICATION NO. : 14/673444
DATED : November 28, 2017
INVENTOR(S) : Yi Li It is certified that error appears in the above-identified patent and that said Letters Patent is hereby corrected as shown below:

In the Claims

Column 23; Line 28; Claim 13 should read:
module using a first event processing node, Signed and Sealed this
Sixth Day of February, 2018

Joseph Matal
*Performing the Functions and Duties of the*
*Under Secretary of Commerce for Intellectual Property and*
*Director of the United States Patent and Trademark Office*